United States Patent [19]

Schneider et al.

[11] Patent Number: 4,509,243

[45] Date of Patent: Apr. 9, 1985

[54] BLIND SIDE SEALER APPARATUS AND METHOD

[75] Inventors: William R. Schneider; Robert B. Smith, both of Columbus, Ohio

[73] Assignee: Gas Research Institute, Chicago, Ill.

[21] Appl. No.: 346,516

[22] Filed: Feb. 8, 1982

[51] Int. Cl.³ .......................... F16L 55/16; B23P 7/04
[52] U.S. Cl. .................................. 29/402.02; 138/98; 29/402.09; 29/402.18
[58] Field of Search ............. 29/401.1, 402.02, 402.12, 29/402.11, 402.09, 402.13, 402.18, 402.07, 402.06, 402.14, 402.01; 220/361, 363, 364, 365

[56] References Cited

U.S. PATENT DOCUMENTS

| | | | |
|---|---|---|---|
| 614,547 | 11/1898 | Haworth | 138/98 |
| 1,171,098 | 2/1916 | Dalton | 138/99 |
| 1,285,210 | 11/1918 | Jones | 138/99 |
| 2,030,171 | 2/1936 | Huck | 10/23 |
| 2,365,372 | 12/1944 | Allen | 45/137 |
| 2,531,270 | 11/1950 | Hood | 85/40 |
| 2,631,360 | 3/1953 | Sanford et al. | 29/402.11 |
| 2,765,699 | 10/1956 | LaTorre | 85/40 |
| 3,114,021 | 12/1963 | Carusi | 10/27 |
| 3,704,173 | 11/1972 | McClelland et al. | 136/135 R |

FOREIGN PATENT DOCUMENTS

| | | | |
|---|---|---|---|
| 226283 | 9/1907 | Fed. Rep. of Germany | 138/98 |
| 359411 | 9/1922 | Fed. Rep. of Germany | 138/98 |
| 130506 | 12/1928 | Switzerland | 138/98 |
| 786997 | 11/1957 | United Kingdom . | |

Primary Examiner—Mark Rosenbaum
Assistant Examiner—V. K. Rising
Attorney, Agent, or Firm—Robert B. Watkins

[57] ABSTRACT

A method and apparatus for the internal or blind side sealing of a small local leak (such as a void in casting). The sealing is accomplished by first drilling a hole in the conduit or container where the leak is located and setting a blind side sealer apparatus in the hole. The device consists of a guide that fits loosely into a drilled hole; a slitted metal conical capping means having an outside diameter approximately the same as the drilled hole diameter; a sleeve; and a retractable stem. The slitted cone is filled with a viscous sealant and the slitted cone part of the sealer assembly is pushed through the hole. Once on the other side of the hole, the slitted cone expands enough to prevent it from backing out. When the stem is pulled outward, the slitted cone is forced against the pipe or container wall, spreading the sealant. The stem then snaps at a necked-down position, signaling completion to the operator.

12 Claims, 4 Drawing Figures

BLIND SIDE SEALER APPARATUS AND METHOD

SUMMARY OF THE INVENTION

This invention relates to a method and apparatus for the blind side sealing of small leaks in the walls of conduits, pipelines or other liquid or gas containing vessels. More particularly, it is an apparatus having some aspects of a "Pop-Rivet" specifically constructed to seal on the inside or blind side of a vessel without direct access to the interior.

Briefly and in summary, the method of this invention is to insert an expandable capping means, which contains a viscous sealant, into a pre-drilled aperture to be sealed. The capping means is attached to a sleeve and a retractive bulb-headed stem sub-assembly which is secured within a guide means. During the sealing operation, retracting the stem causes the bulbous head to apply an axially compressive force to the splaying expandable capping means, thereby securing the apparatus within the aperture and spreading the adhesive caulking sealant upon and throughout the juncture of the vessel wall and the sealer apparatus. When a maximum compressive force is attained, the grippable extension of the stem breaks free, completing the sealing operation.

The apparatus of this invention is an assembly comprising:

a. a retractable stem having at one end in sequential spaced relation, an enlarged bulb-like head, a stem portion, a neck portion of reduced size and an extension portion which is grippable;
b. a sleeve member coaxially surrounding the stem, juxtaposed and surrounding the head portion, and having a collar means portion at the end opposite to the head portion;
c. a guide means encircling the sleeve member, constructed to nominally fit in a pre-drilled aperture in the wall of the vessel to position the apparatus;
d. an expandable capping means encircling the sleeve member between the head surrounding portion and the guide means; and
e. a viscous caulking sealant interposed between the capping means, the guide means, and the vessel when the apparatus is in place.

In many industries and for many years there has been a need for stopping and sealing small local leaks in liquid and gas containing pipes and vessels. These leaks often develope where imperfections in the manufacturing process leave voids or weak spots in the cast materials. External corrosion of steel pipes also causes leaks. The introduction of pressurized liquids or gases into the pipe may cause these spots to leak.

Many pipelines are so small as not to be interiorly accessible by human workers so that the application of closings and seals at any distance beyond arms length renders very difficult a satisfactory sealing and closing operation.

It is common practice to pull or push an object, plug, or mechanism through a pipeline to accomplish the cleaning, sealing or coating.

Nevertheless, because coating and sealing operations are carried out beyond sight of the operator and by remote control, the quality of the work is often unsatisfactory.

The natural gas service industry is one which needs new and improved repair methods that could be used as alternatives to the techniques and procedures now used in the industry for repairing leaks in gas distribution mains and services. In this industry, steel pipe continues to be the dominant material in existing pipelines. Most of the leaks in both mains and services have occurred in steel pipe, reflecting the greater amount of steel pipe in use. More than three times as many leaks per total mile occur in steel mains as occur in cast iron mains, although leaks in cast iron mains have been increasing as a percentage of the total leaks in the systems.

Even recently developed more effective methods are prohibitively expensive where a small localized leak is to be sealed. Despite the past search for effective methods, the repair technique of choice has been and continues to be the implacement of various types of clamps upon the outside of the leaking section of a pipe. As the size of the conduit or vessel increases this method becomes increasingly less practical.

An important criteria for methods of repairing leaks in pipelines is the cost. Costs of repairs and seals are influenced, of course, by time and materials and the efforts expended in excavation, etc.

It is an object of this invention to provide a process and apparatus for repairing pipelines, and in a broader sense other conduits and cylinders, that overcome the disadvantages of the prior art and provides a reliable and easily applied blind side seal to local leaks in gas and liquid conduits and vessels. It is an additional significant purpose to contain the burstive pressures of the contained materials and to enhance the strength of the seal.

It is a purpose to accomplish the objectives and meet the criteria with a satisfactory sealing and securing method in a manner more economical than prior techniques.

The foregoing and other advantages of the invention will become apparent from the following disclosure in which a preferred embodiment of the invention is described in detail and illustrated in the accompanying drawings. It is contemplated that variations in procedures, structural features and arrangement of parts may appear to the person skilled in the art without departing from the scope or sacrificing any of the advantages of the invention.

DETAILED DESCRIPTION OF THE INVENTION

Figure 1:
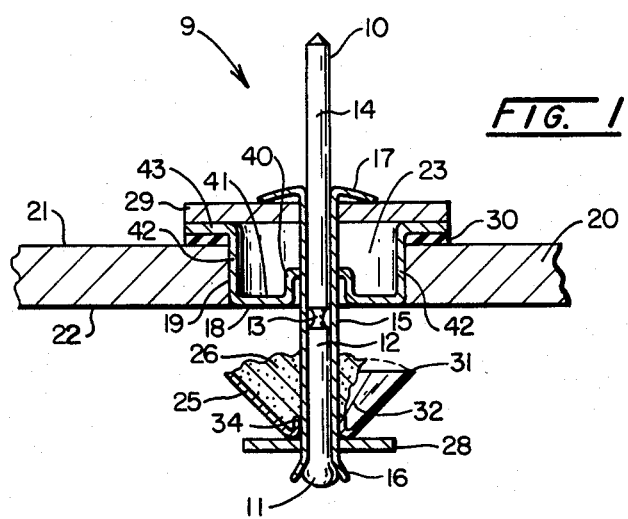
FIG. 1 is a sectional view of a sealer apparatus of this invention, inserted in an aperture in a conduit in readiness for a sealing operation according to the method of this invention.

Referring to FIG. 1, a blind side sealer apparatus 9 of this invention includes a central stem member 10 consisting of a bulb-like head portion 11, a main shaft portion 12, a narrowed down neck portion 13, and an extension portion 14.

The stem member 10, as well as the other parts of the sealer 9, to be enumerated and described in this preferred embodiment, are coaxial and cylindrical or symmetrical relative to the common axis. It may be possible that shapes other than those of circular cross-section could be used, but that which is shown is preferred and typical.

The stem member 10 is encircled by a sleeve member 15 which consists of a widened and tapered end 16 in juxtaposition to accommodate the bulbous head 11, and at the opposite end, a flange-like collar 17.

Coaxially surrounding the stem 10 and sleeve 15 combination, a guide member 18 is positioned between the ends of the stem. Guide member 18 is formed with a predominately dish portion 23. The dish portion 23 includes a recess section 40, a radial flange 41, an axial guide wall 42, and a shoulder flange 43. The guide wall 42 generally conforms and loosely fits within an aperture 19 in a conduit 20. The conduit 20 has an outside wall 21 and inside wall 22.

A resiliant washer-like gasket 30 is positioned between the outer wall 21 and the axial wall 43 which fills the variable space between the two. The variable space is caused by irregularities on the outside wall 21 and the difference in form between the curved outside wall 21 of the conduit 20 and the flat interface of the shoulder flange 43.

The aperture 19 will usually be a round hole drilled at the site of the leak or potential leak which has been drilled during the practice of the invention method in a preparatory step.

A load distributing washer 29 is fitted between the flange-like collar 17 and the shoulder flange 43 of the guide member 18. Alternatively, the collar 17 could extend outward to a position in contact with the shoulder flange 43.

A capping means 25 encircles the sleeve member 15 at a position adjacent to the washer 28 near the tapered end 16. The capping means 25 is constructed in the shape of a cone and is provided with an annular collar 34 in sliding engagement with the outside of the sleeve 15. A plurality of slits 32 are provided in the wall of the cone giving it a degree of elastic deformation when subjected to inward peripheral pressure at the outside edge. A rounded leading edge 31 of the slitted cone insures that it will not catch and be held by the rim edge of the aperture 19 in the vessel wall 20.

In the practice of the method of the invention, a leak or other defect in conduit 20 is identified by visual inspection or other instrumented means from a position at the outside wall 21. In most instances of gas pipeline repair, some amount of excavation is necessary in the identification and preparation operations.

The aperture 19 is made in the vessel 23 as the next step. This usually consists in drilling a hole of a size slightly larger than the defective area and the outside diameter of the axial guide wall 42.

In the next step, the sealer 9 is inserted in the aperture 19, as shown in FIG. 1. A nominally loose fit is satisfactory, and close tolerances are not required. In the insertion process, the edge 31 may be elastically deflected slightly to permit entrance, and provide a spring back over the inside edge of the aperture 19.

Prior to the insertion of the sealer 9 a viscous adhesive sealant 26 is placed in the hollow of capping means 25. The sealant 26 is of a type that is impervious to bad effects from the type of fluid to be carried within the conduit.

Figure 2:
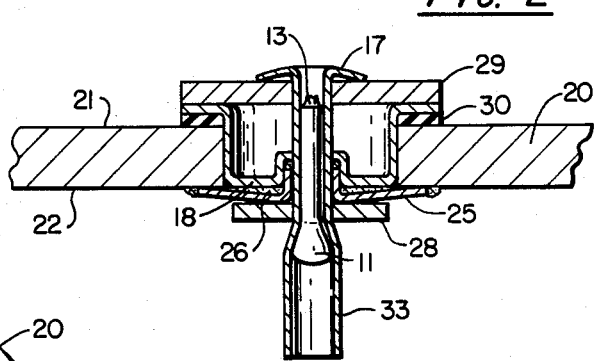
FIG. 2 is a sectional view of the same apparatus after the sealing operation is complete.

Referring to FIG. 2, an outward pull is next exerted on the stem 10 while simultaneously applying inward pressure on the flange 17 of the sleeve 15. This combination of outward tension and inward pressure forces may be created by one of a variety of tools, either adapted from "Pop-Rivet" techniques or specially made for the purpose, which are well within the conventional practice of those skilled in the art.

Figure 3:
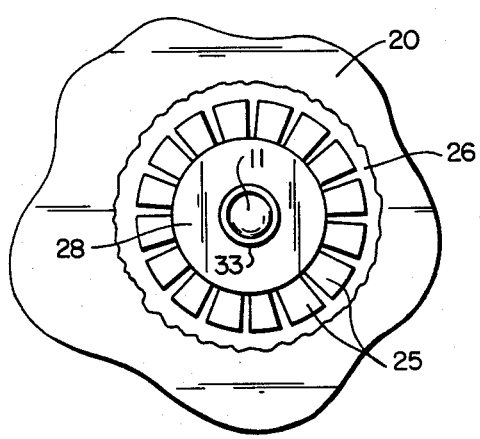
FIG. 3 is a plan view from the interior of the conduit after completion of the sealing operation.

The outward force on the stem pulls the stem outward through the sleeve causing the head portion 11 to expand the sleeve while sliding the washer 28 and capping means 25 outwardly along the sleeve. The capping means progresses until it contacts the inner wall 22 of the vessel 20 where it deforms and expands through the facility of the slits 32. During the splaying action of the capping means 25 and the expansion thereof, the viscous sealant 26 is forced into all the crevices and openings between the parts of the sealer 9 and the vessel 20. At the same time the washer 29 is forced against the flange portion 43 compressing the gasket 30 in a further sealing action. When the movement and compression of the parts has reached the position shown in FIG. 2, the tensile forces in the neck portion 13 reach such a point that the stem end breaks off at the neck portion 13 signalling the completion of the seal. During the splaying action of the capping means 25, sealant 26 spreads throughout all accessible areas of the sealer 9 as well as on the inner wall 22 of the vessel 20, as shown in FIG. 3.

Figure 4:
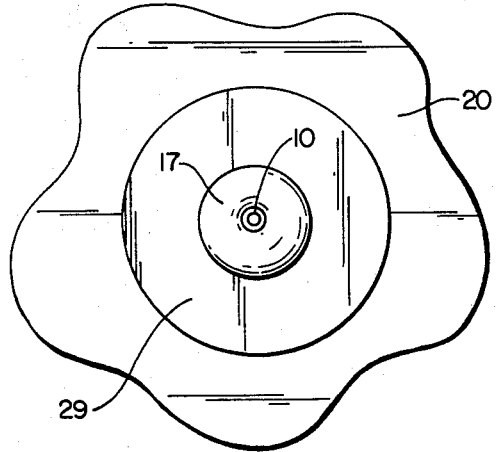
FIG. 4 is a plan view from the exterior of the conduit after completion of the sealing operation.

Normally the sealant does not reach the outside surface and the sealer takes the appearance shown in FIG. 4 when in place.

Movement of the head 11 through the sleeve 15 swages the annular shape outward creating an enlarged portion 33. The forces created in this swaging action, as well as the pressing forces from the opposite side of the vessel 20, creates sufficient static friction that the assembled sealer remains in place from the remaining frictional engagement of the parts.

The process of this invention is particularly significant to the natural gas pipeline industry as it provides a means for inexpensively and reliably sealing a small localized leak. It has the advantage of placing the seal within an inaccessible vessel or conduit and thereby creating a much stronger and more permanent seal capable of withstanding great pressure and, in point of fact, using that pressure to further stabilize the seal.

In each use of the invention an appropriate selection must be made for the proper adhesive sealant, this being well within the ability of those skilled in the field of chemical adhesives. The selection will be from among those sealants appropriate for adherence to the vessel wall as well as insoluble in the presence of whatever liquid or gas is contained in the vessel. It will also be non-contaminative to this liquid or gas.

An appropriate selection will also be made pertaining to the dimensions of the blind side sealer apparatus in relation to each individual leak situation. Minor variations in the preferred embodiment described herein will make this invention capable of halting a wide variety of leaks.

Although a preferred embodiment of the invention has been herein described, it will be understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalence thereof.

What is claimed is:

1. An apparatus for the blind sealing of leaks through the wall of a vessel from inside the vessel to outside the vessel, comprising:
   a. a stem having in sequential spaced relation an enlarged head portion, a neck portion of reduced size and an extension portion;
   b. a sleeve member coaxially surrounding the stem in juxtaposition to acommodate and surround the head portion, and having a collar means portion at the end opposite to the head portion of the stem;
   c. a guide means encircling the sleeve member, constructed to loosely fit in a preformed aperture in the wall of the vessel to position the apparatus;
   d. an expandable capping means encircling the sleeve member between the head surrounding portion and the guide means; and
   e. a viscous caulking sealant interposed between the capping means, the guide means, and the vessel.

2. A sealing apparatus, according to claim 1, wherein the expandable capping means has a slit conical shape in an unexpanded position prior to being forced to an expanded position.

3. A sealing apparatus, according to claim 2, wherein a washer is interposed between the capping means and the position of the head portion of the stem.

4. A sealing apparatus, according to claim 3, wherein a washer is interposed between the collar means portion of the sleeve member and the guide means.

5. A sealing apparatus, according to claim 4, wherein a resilient seal is interposed between the guide means and the wall of the vessel.

6. A sealing apparatus for the blind sealing of leaks through the wall of a vessel from inside the vessel to outside the vessel by operation from an insertion mode to an inplace mode, comprising:
   a. a guide means constructed to loosely fit an aperture in the wall of the vessel, the aperture having an axis substantially perpendicular to the wall of the vessel, the guide means having a sleeve member passing therethrough coaxily with the guide means;
   b. the sleeve member having a collar portion at the outside end, and being surrounded by an expandable capping means slidingly engaged on the sleeve member at the inside end;
   c. a stem coaxially and slideably positioned within the sleeve member having an enlarged head at the inside end, an extension portion at the outside end, and a neck portion of reduced size between the ends;
   d. in the insertion mode, the capping means being unexpanded and positioned on the sleeve between the head portion of the stem and the guide means, with a viscous adhesive sealant material interposed between the capping means and the guide means;
   e. the stem being slideable within the sleeve by tension on the extension portion to move the head portion through the sleeve and to force the capping means slideably along the sleeve member toward the guide means thereby expanding the capping means and compressing the sealant between the capping means and the guide means, covering the aperture and crevices between the parts of the apparatus in the inplace mode; and
   f. in the inplace mode, the extended portion of the stem being severed from the remainder of the stem at the neck portion.

7. A sealing apparatus according to claim 6 wherein the capping means is capable of compressible elastic deformation in the insertion mode.

8. A sealing apparatus, according to claim 6, wherein a washer is interposed between the capping means and the position of the head portion of the stem.

9. A sealing apparatus, according to claim 8, wherein a washer is interposed between the collar means portion of the sleeve member and guide means.

10. A sealing apparatus, according to claim 9, wherein a resilient seal is interposed between the guide means and the outside of the vessel.

11. A method of sealing a leak or defect in the wall of a vessel for containing fluid, with access to one side and without access to the other blind side, comprising:
    a. drilling a hole through the wall of the vessel from a position outside the vessel, the drilled hole removing the defect in the wall of the vessel;
    b. conveying a viscous sealant through the hole to the blind side of the wall of the vessel upon an expandable capping means;
    c. guiding the capping means to a position encompassing the hole with a guiding means;
    d. expanding the capping means by a force against the capping means from outside the vessel while forcing the capping means against the inside wall of the vessel and simultaneously spreading the viscous sealant throughout the crevices between the capping means, the guiding means, and the vessel.

12. A method according to claim 11 wherein the outward force upon the capping means is provided by a frangible stem which breaks at the end of Step d, signaling that the operations are complete.

* * * * *